United States Patent
Clough et al.

(10) Patent No.: US 9,352,529 B2
(45) Date of Patent: May 31, 2016

(54) PROGRESSIVE STIFFNESS STRUCTURAL-ACOUSTIC SANDWICH PANEL

(71) Applicant: HRL LABORATORIES, LLC, Malibu (CA)

(72) Inventors: Eric C. Clough, Santa Monica, CA (US); Jacob M. Hundley, Newbury Park, CA (US); Chia-Ming "Gavin" Chang, Agoura Hills, CA (US); Alan J. Jacobsen, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/731,074

(22) Filed: Jun. 4, 2015

(65) Prior Publication Data

US 2016/0046095 A1 Feb. 18, 2016

Related U.S. Application Data

(60) Provisional application No. 62/036,564, filed on Aug. 12, 2014.

(51) Int. Cl.
*G10K 11/168* (2006.01)
*B32B 3/12* (2006.01)
*B32B 7/12* (2006.01)
*B32B 27/40* (2006.01)
*B32B 3/26* (2006.01)

(52) U.S. Cl.
CPC . *B32B 3/12* (2013.01); *B32B 3/266* (2013.01); *B32B 7/12* (2013.01); *B32B 27/40* (2013.01); *G10K 11/168* (2013.01); *B32B 2305/024* (2013.01); *B32B 2307/102* (2013.01); *B32B 2307/51* (2013.01); *B32B 2605/00* (2013.01)

(58) Field of Classification Search
CPC ......... G10K 11/168; B32B 3/12; B32B 3/266
USPC .................................................. 181/286, 292
See application file for complete search history.

(56) References Cited

U.S. PATENT DOCUMENTS

| | | | |
|---|---|---|---|
| 3,087,570 | A | 4/1963 | Watters et al. |
| 4,106,588 | A | 8/1978 | Moore et al. |
| 6,207,256 | B1 | 3/2001 | Tashiro |
| 7,997,384 | B2 | 8/2011 | Boock |
| 8,197,930 | B1 | 6/2012 | Jacobsen et al. |
| 8,640,825 | B2 * | 2/2014 | Vauchel .................. F02K 1/827 181/222 |

(Continued)

OTHER PUBLICATIONS

Kurtze et al., "New Wall Design for High Transmission Loss or High Damping," The Journal of the Acoustical Society of America, 31(6):739-748, Jun. 1959.

(Continued)

*Primary Examiner* — Jeremy Luks
(74) *Attorney, Agent, or Firm* — Lewis Roca Rothgerber Christie LLP

(57) ABSTRACT

A sandwich material having both structural strength and significant acoustic attenuation. In one embodiment, a sandwich is composed of an architected core secured between two facesheets, with a compliant layer forming the connection between the core and the facesheets. The compliant core has a low modulus, resulting in a low speed for elastic shear waves in the sandwich, at low static loads. At high static loads the compliant material stiffens and allows the sandwich to exhibit significant structural strength.

18 Claims, 14 Drawing Sheets

(56) References Cited

U.S. PATENT DOCUMENTS

| | | | |
|---|---|---|---|
| 8,921,702 B1* | 12/2014 | Carter | H05K 1/0204 |
| | | | 165/104.11 |
| 9,116,428 B1* | 8/2015 | Jacobsen | G06F 7/09 |
| 2002/0170941 A1 | 11/2002 | Wallach et al. | |
| 2005/0263346 A1* | 12/2005 | Nishimura | E04B 1/86 |
| | | | 181/290 |
| 2009/0282773 A1 | 11/2009 | Queheillalt et al. | |
| 2010/0151189 A1 | 6/2010 | Chakrabarti | |
| 2013/0276308 A1 | 10/2013 | Kang et al. | |

OTHER PUBLICATIONS

Moore et al., "Sound transmission loss characteristics of sandwich panel constructions," J. Acoust. Soc. Am., 89(2): 777-791, Feb. 1991.
Gibson et al., "Cellular Solids: Structures and Properties," Cambridge University Press, Chapters 4 and 5, 143 pages, 1988.
International Search Report and Written Opinion for International Application No. PCT/US2015/034242, mailed Sep. 30, 2015, 9 pages.

* cited by examiner

PROGRESSIVE STIFFNESS STRUCTURAL-ACOUSTIC SANDWICH PANEL

CROSS-REFERENCE TO RELATED APPLICATION(S)

The present application claims priority to and the benefit of U.S. Provisional Application No. 62/036,564, filed Aug. 12, 2014, entitled "PROGRESSIVE STIFFNESS STRUCTURAL-ACOUSTIC SANDWICH PANEL", the entire contents of which are incorporated herein by reference.

The present application is related to U.S. Pat. No. 7,382,959 ("the '959 patent") and U.S. Pat. No. 7,938,989 ("the '989 patent"), the entire contents of both of which are incorporated herein by reference.

FIELD

One or more aspects of embodiments according to the present invention relate to structural panels, and more particularly to a composite sandwich panel providing structural strength and good acoustic attenuation.

BACKGROUND

Sheet structures used in mechanical applications may in certain circumstances be subject to performance requirements that are in tension with one another. For example, it may be desirable for a sheet to have significant strength to resist hoop stresses, if the sheet is formed into a tube, or to resist bending stresses if the sheet is used as a platform to carry weight, e.g., as the floorboard of a vehicle. It may also be desirable that such a sheet attenuate elastic, e.g., sound waves, for example to provide sound protection inside a vehicle. Traditional sheet structures, including composite sheet designs such as related art sandwich structures, may need to sacrifice mechanical stiffness if materials and dimensions are chosen to achieve high acoustic transmission loss.

Thus, there is a need for a design for a structural sheet exhibiting both mechanical strength and high attenuation of acoustic waves.

SUMMARY

Aspects of embodiments of the present disclosure are directed toward a sandwich structure having both structural strength and significant acoustic attenuation. In one embodiment, a sandwich structure is composed of an architected core secured between two facesheets, with a compliant layer forming the connection between the core and the facesheets. The compliant layer has a low modulus, resulting in a low speed for elastic shear waves in the sandwich structure, at low static loads. At high static loads the compliant material stiffens and allows the sandwich structure to exhibit significant structural strength and stiffness.

According to an embodiment of the present invention there is provided a sandwich structure, including: an architected core having a first major surface and a second major surface facing away from the first major surface; a first facesheet secured to the first major surface; and a second facesheet secured to the second major surface, the core including, at the first major surface, a first plurality of pedestals, each of the first plurality of pedestals being separated from the first facesheet by a base gap of a first plurality of base gaps, the base gap having a width, and being joined to the first facesheet by a compliant base layer of a first plurality of compliant base layers in the first base gap, a thickness of the compliant base layer being equal to the width of the base gap, and a Young's modulus of the compliant base layer being less than a Young's modulus of the first facesheet.

In one embodiment, the structure includes: a plurality of first truss members defined by a plurality of first self-propagating polymer waveguides and extending along a first direction.

In one embodiment, the micro-truss material includes, as a major component, a material selected from the group consisting of polymers, metals, ceramics, composite materials, and combinations thereof.

In one embodiment, the structure includes: a first plurality of pedestal casings, each corresponding to one of the first plurality of pedestals, each pedestal casing secured to the first facesheet and surrounding the corresponding pedestal, an interior side wall of each pedestal casing separated from a side wall of the corresponding pedestal by a side gap, of a plurality of side gaps, having a width; and a plurality of compliant side layers, each compliant side layer corresponding to a first pedestal, each compliant side layer having a thickness equal to the width of the side gap and filling the side gap.

In one embodiment, the widths of each of the plurality of side gaps and of each of the first plurality of base gaps are selected so that over a frequency range of interest a shear wave speed is lower than a speed of sound in air and over the frequency range of interest a bending wave speed is different from the speed of sound in air, the frequency range of interest being the range from 200 Hz to 4000 Hz.

In one embodiment, the structure includes: a compliant core-covering layer coating the plurality of first truss members, wherein the first plurality of compliant base layers, the plurality of compliant side layers, and the compliant core-covering layer form one continuous body of one material.

In one embodiment, the material includes, as a major component, an elastomer with a loss tangent greater than 0.05.

In one embodiment, each of the first plurality of pedestals includes a top surface, and wherein each corresponding pedestal casing includes a top portion covering a portion of the top surface of the corresponding pedestal, an interior top surface of each pedestal casing being separated from a top surface of the corresponding pedestal by a top gap having a width, and the structure further includes a plurality of compliant top layers, each corresponding to a first pedestal, each compliant top layer having a thickness equal to the width of the top gap and filling the top gap.

In one embodiment, each of the pedestal casings includes, as a major component, a material selected from the group consisting of epoxy adhesives, acrylic adhesives, photopolymers, and combinations thereof.

In one embodiment, the pedestal casings of the first plurality of pedestal casings form one continuous body.

In one embodiment, the micro-truss material further includes: a plurality of second truss members defined by a plurality of second self-propagating polymer waveguides and extending along a second direction; and a plurality of third truss members defined by a plurality of third self-propagating polymer waveguides and extending along a third direction, wherein the first, second, and third truss members interpenetrate each other at a plurality of nodes to form a continuous material.

In one embodiment, the core is in the shape of a sheet.

In one embodiment, each of the first plurality of pedestals has a substantially flat base surface substantially parallel to the first facesheet.

In one embodiment, a tangent shear modulus of the structure, corresponding to shear of the first facesheet relative to the second facesheet, is less, by a factor of at least 30, in a first state than in a second state, the first state corresponding to a static shear strain of less than 0.015, and the second state corresponding to a static shear strain of more than 0.05.

In one embodiment, the compliant base layer includes, as a major component, a material selected from the group consisting of urethane elastomers, thermoplastic elastomers, and combinations thereof.

In one embodiment, the compliant base layer includes, as a major component, a filled elastomer.

In one embodiment, the core includes, at the second major surface, a plurality of second pedestals, each of the second pedestals having a substantially flat base surface substantially parallel to the second facesheet, separated from the second facesheet by a base gap of a second plurality of base gaps, the base gap of the second plurality of base gaps having a width, and being joined to the second facesheet by a compliant base layer, of a second plurality of compliant base layers, in the second base gap, the thickness of the compliant base layer of the second plurality of compliant base layers being equal to the width of the base gap of the second plurality of base gaps, and a Young's modulus of the compliant base layer of the second plurality of compliant base layers being less than 100 megapascals (MPa).

In one embodiment, the core includes an open volume, the open volume being filled with a porous material selected to reduce a speed of sound within the open volume of the core and to increase acoustic transmission loss in the structure.

In one embodiment, the core includes an open volume, the open volume of the core being subdivided by a membrane layer of continuous or selectively perforated construction.

In one embodiment, the structure includes: a plurality of cell walls forming a plurality of hexagonal cells, each hexagonal cell having an axis substantially perpendicular to the first facesheet and the second facesheet, wherein each of the first pedestals extends along an edge of a cell wall, the edge being substantially parallel to the first facesheet.

In one embodiment, each of the plurality of hexagonal cells includes a secluded volume, and wherein each of the secluded volumes is subdivided by a membrane layer of either continuous or selectively perforated construction.

BRIEF DESCRIPTION OF THE DRAWINGS

These and other features and advantages of the present invention will be appreciated and understood with reference to the specification, claims and appended drawings wherein:

DETAILED DESCRIPTION

Figures 1A, 1B:
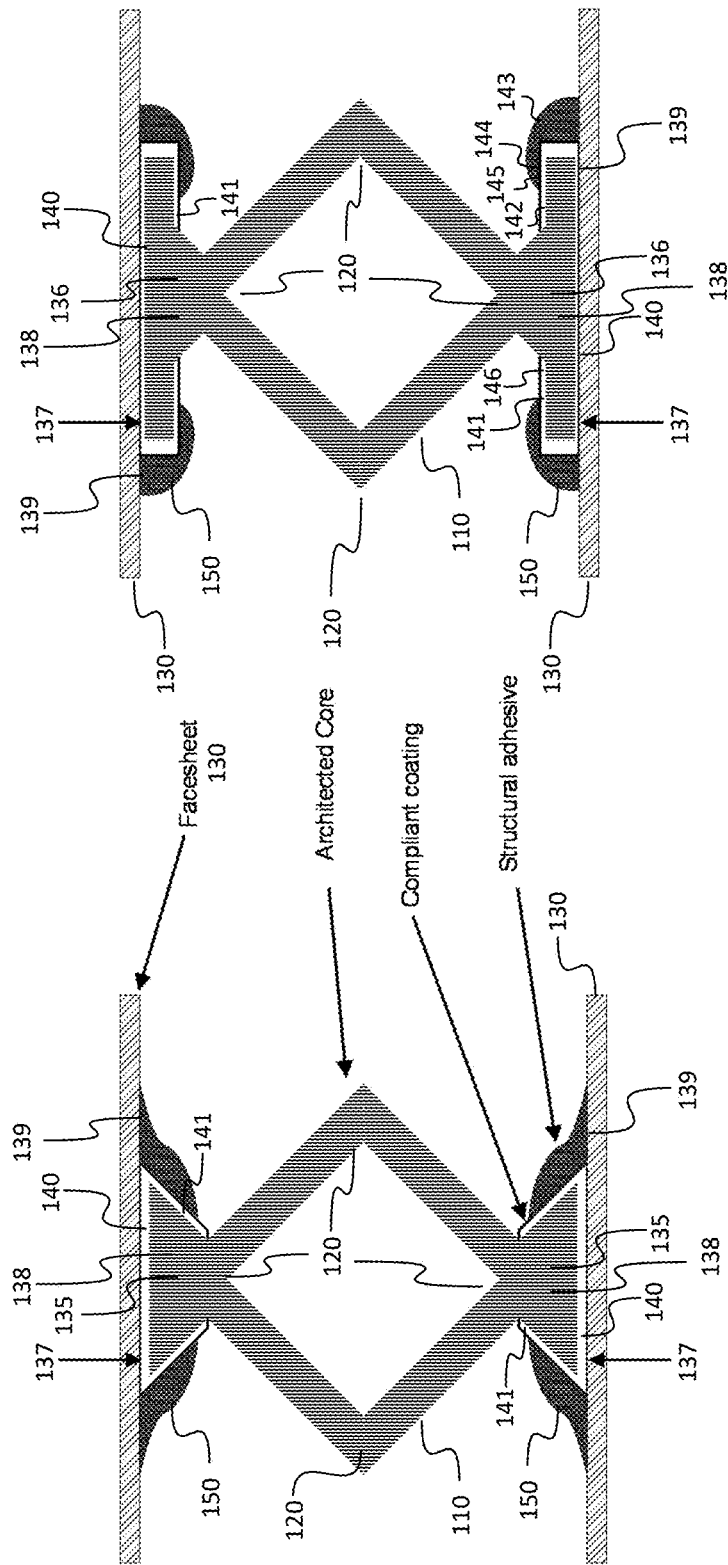
FIG. 1A is a schematic cross-sectional view of a composite structural panel according to an embodiment of the present invention.
FIG. 1B is a schematic cross-sectional view of a composite structural panel according to another embodiment of the present invention.

The detailed description set forth below in connection with the appended drawings is intended as a description of exemplary embodiments of a progressive stiffness structural-acoustic sandwich panel provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Embodiments of the present invention relate to a sandwich structure with a low stiffness and high damping for acoustic disturbances, and a significantly higher stiffness for structural deflections. A sandwich panel according to one embodiment has an architected core in the shape of a sheet, i.e., having two major surfaces, a first major surface and a second major surface, that are substantially parallel and account for a major part of the total surface area of the core. The core may be composed of (or may include, as a major component) a micro-truss material fabricated, for example, according to the methods disclosed in the '989 patent and in the '959 patent. The sandwich structure includes the core and two facesheets, the core being sandwiched between the two facesheets, and each of the facesheets being made of a material different from that of the core.

According to one embodiment of the present invention, the micro-truss material is formed by using a fixed light input (collimated UV light) to cure (polymerize) polymer optical waveguides, which can self-propagate in a three-dimensional (3D) pattern. Some liquid monomers, referred to as photomonomers, polymerize when exposed to light (e.g., UV light), and undergo a refractive index change during the polymerization process. The refractive index change can lead to a formation of polymer optical waveguides. If a monomer that is photo-sensitive is exposed to light (typically UV) under the right conditions, the initial area of polymerization, such as a small circular area, will "trap" the light and guide it to the tip of the polymerized region, further advancing that polymerized region. This process will continue, leading to the formation of a self-propagating photopolymer waveguide structure with approximately (about) the same cross-sectional dimensions along its entire length.

A mask with a two-dimensional pattern of apertures may thus be used to create a three-dimensional polymer microstructure. A system for forming a 3D polymer microstructure according to an embodiment of the present invention includes one or more collimated light sources, a reservoir (mold) having a volume of monomer or "photomonomer" that will polymerize at a wavelength of collimated light beams provided by the light sources, and a patterning apparatus, such as a mask with multiple apertures (open areas). Each of the apertures has a given shape and dimension substantially matching a cross-section geometry of a waveguide. A truly three-dimensional network may be formed because the polymer waveguides may intersect at intersection points or "nodes" and the intersecting polymer waveguides may simply polymerize together, the intersection of waveguides not interfering with waveguide propagation. The spacing between the plurality of waveguides corresponds with the pattern of the plurality of apertures.

The waveguides thus formed may then be used as the micro-truss material, or subsequent steps may be taken to modify the material. For example, a coating may be added to the waveguides and nodes to form a coated micro-truss structure, the photopolymer may be etched out after coating to form a hollow micro-truss structure, the voids left by removing the photopolymer may be filled with another material to form another coated micro-truss structure, and the coating may be removed to form an uncoated micro-truss structure composed of a material different from the photopolymer. Any of these structures, such as the micro-truss structure of FIG. 10, including or consisting of truss members 110 intersecting at nodes 120, may be used as a micro-truss core for embodiments of the present invention. Also, as shown in FIG. 10, the micro-truss core may be formed from stacked layers of truss members 110.

By these processes, micro-truss structures composed of polymers, metals, ceramics, or composite materials may be formed. In each case, each truss member is defined by a self-propagating polymer waveguide, which either forms the truss member or an element of the truss member, or was a precursor in the formation of the truss member.

Figure 10:
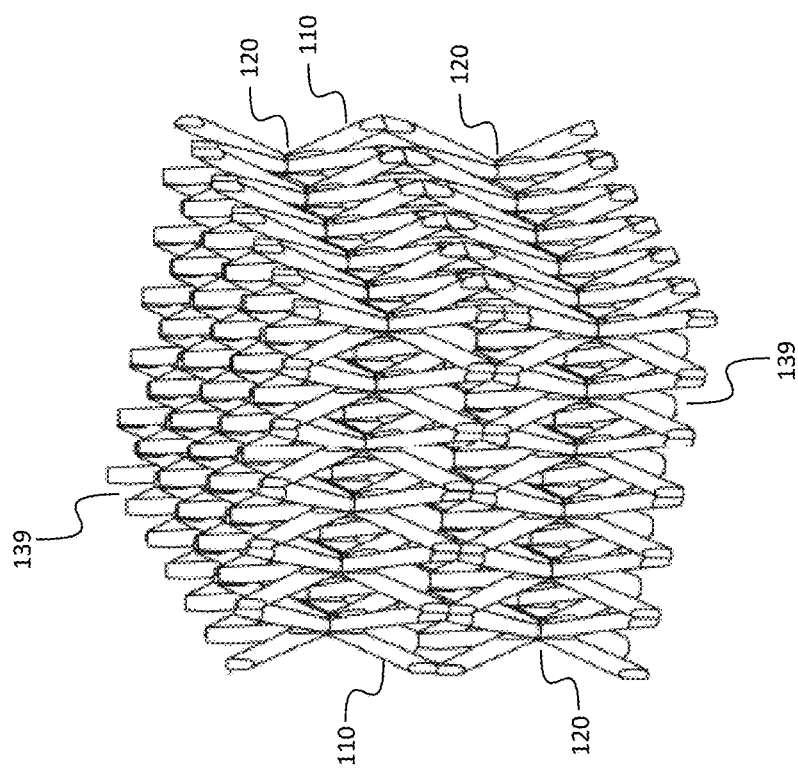
FIG. 10 is a perspective drawing of a micro-truss structure according to an embodiment of the present invention.

Referring to FIG. 1A, the micro-truss core (e.g., architected core 120), composed of a plurality of truss members 110 intersecting at a plurality of nodes 120, is sandwiched between a first facesheet 130 and a second facesheet 130, and secured to the first and second facesheets 130 at a plurality of attachment points 138, corresponding approximately to locations of nodes 120 near the first and second major surfaces 139 of the core, respectively (see also FIG. 10). At each attachment point 138, the core has a pedestal 135 with a substantially flat surface, spaced apart from the interior surface of the adjacent facesheet by a small gap or "base gap" 137. The base gap 137 is filled with a compliant material to form a layer 140 (a "compliant base layer") of a compliant material. In one embodiment, the compliant material has a Young's modulus of less than 100 megapascals (MPa). In another embodiment, the compliant material has a Young's modulus of less than 10 megapascals (MPa). In another embodiment, the compliant material has a Young's modulus lower than a Young's modulus of the material used to form one or both of the truss members 110 and the facesheets 130.

The pedestals 135 may be in the form of pyramids, as illustrated in FIG. 1A, e.g., tetrahedra if the micro-truss is formed of truss members 110 extending in three directions, or four-sided pyramids if the micro-truss is formed of truss members 110 extending in four directions. The angle between any pair of truss members may be may be acute, obtuse, or a right angle. The angle may be between 10 and 170 degrees, projected onto the mask that may be used to form the micro-truss. In another embodiment, the pedestals 136 may be in the form of flat pads, e.g., disks or squares, as illustrated in FIG. 1B.

These pedestals 135, 136 may be formed by one or more of several methods. During the formation of the micro-truss sheet, an extended exposure to ultraviolet (UV) light may cause the nodes 120 to grow as a result of heating effects, and, if one of the major surfaces of the micro-truss sheet is against a surface of the reservoir of photomonomer or the top surface of the volume of photomonomer, the node may form a pedestal 135, with a flat surface forming against the surface of the reservoir or the top surface of the volume of photomonomer. In another embodiment, after a micro-truss sheet is formed, it may be placed on a mold in the form of a flat sheet with a plurality of flat-bottomed holes, with each node on one of the major surfaces of the micro-truss sheet fitting into one of the flat-bottomed holes. Each of the flat-bottomed holes may be filled with a pool of photomonomer resin and the combination of the micro-truss sheet and the pools of resin may be illuminated with UV light, causing the resin in the pools to cure, forming pedestals 136. This method may be used to make pedestals 136 in the form shown in FIG. 1B, or, if sufficiently deep holes are used, taller pedestals may be formed. In another embodiment, a micro-truss sheet may be dipped into photomonomer resin so that a drop of photomonomer resin coats each node on one of the major surfaces of the micro-truss sheet. The micro-truss sheet may then be placed on a flat non-adhering surface (e.g., a polytetrafluoroethylene surface or a surface coated with mold release), so that each drop forms a shape with a flat surface, and illuminated with UV light, thereby causing the resin drops to cure into pedestals 135, 136.

The compliant layer 140 may be composed of any of a number of elastomers, including urethane elastomers and thermoplastic elastomers, and it may be a filled elastomer, i.e., a composite material composed of an elastomer and a non-elastomeric filler composed of, e.g., glass fibers, glass spheres, or lead powder. The compliant layer 140 may be applied to the pedestals 135, 136 by dipping the micro-truss sheet into liquid elastomer, one major surface 139 at a time to a depth sufficient to coat the pedestals 135, 136 on the major surface 139. The micro-truss sheet may then be sandwiched between the facesheets 130, and clamped with a force selected to compress the compliant layer 140 to the desired thickness. The compliant layer 140 may then be allowed to cure.

Each of the pedestals 135, 136 may be made captive against a facesheet 130 by forming a plurality of casings 150, each secured to the facesheet 130 and each overlapping, e.g., the sloping surfaces of a tetrahedral or pyramidal pedestal 135 (as in FIG. 1A), or the side surfaces and top surfaces 142 of a flat pedestal 136. A casing 150 of a flat pedestal 136 may have a top portion 143 with an interior top surface 144 forming a top gap 145, with a width 146, with the top surface 142 of the pedestal (as in FIG. 1B). These casings 150 may be formed, for example, of epoxy, which may be allowed to wick, in liquid form, onto the elastomer-coated pedestals 135, 136 and then set to adhere to the facesheet 130 around each pedestal 135, 136 and form a casing 150 around each pedestal 135, 136. In other embodiments, the casings 150 include, as a major component, material selected from the group consisting of epoxy adhesives, acrylic adhesives, photopolymers, and combinations thereof. The compliant layer 141 surrounding the sides (the "compliant side layer") and top of each pedestal may in general have a different thickness (and the corresponding gaps may have different widths). Thus, the gap, or "side gap", between the casing 150 and the pedestal, on the sides of the pedestal, may have a width different from the width of the base gap 137 between the pedestal and the facesheet 130, on the bottom of the pedestal 135, 136. Similarly, the gap, or "top gap" between the casing 150 and the pedestal on the top of the pedestal may have a different width from the width of the base gap 137 between the pedestal and the facesheet 130, on the bottom of the pedestal 135, 136.

In one embodiment, the entire core is coated with the material used to form the compliant layer 140, forming a compliant core-covering layer, so that the compliant base layers, the compliant side layers, and the compliant core-covering layer form one continuous body of one material. The compliant core-covering layer may provide significant damping to the core, having, e.g., a loss tangent of 0.05 or greater. In one embodiment, one facesheet 130 is rigidly secured to the core material, and only the other facesheet 130 is secured to the core using a compliant layer 140.

Figure 2B:
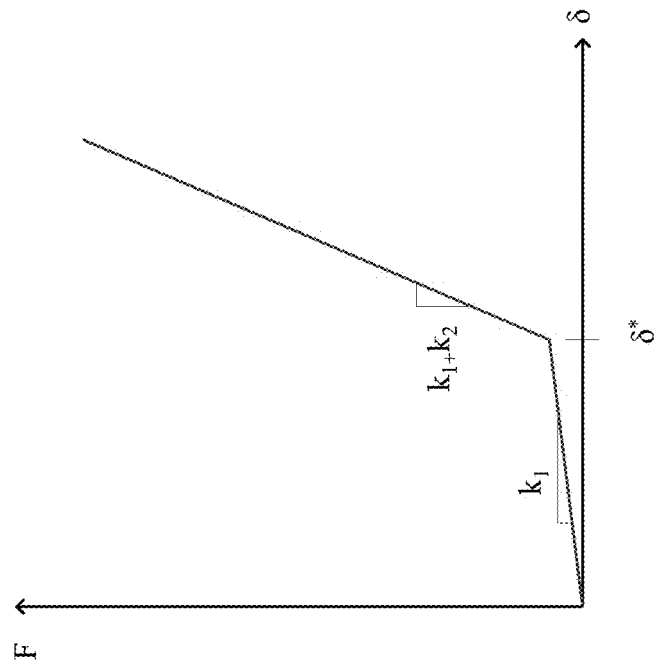
FIG. 2B is a graph of force as a function of displacement for the progressive compound spring of FIG. 2A, according to an embodiment of the present invention.
Figure 2A:
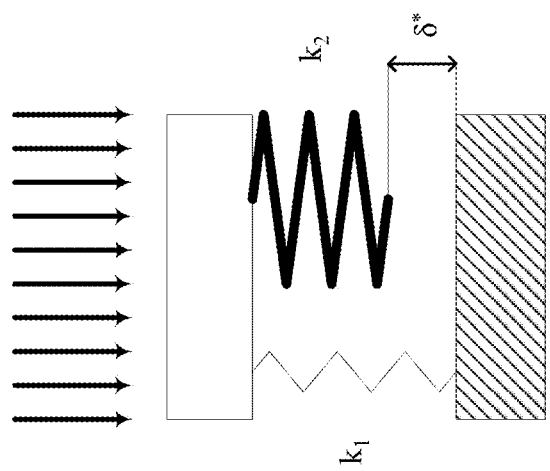
FIG. 2A is a schematic diagram of a progressive compound spring according to an embodiment of the present invention.

The compliant layers 140, 141 around and under the pedestals 135, 136 may be more compliant when the sandwich structure is in an unstressed state, e.g., when each pedestal is centered in its casing 150, than when the sandwich structure is subjected to a large stress, and the compliant layer is significantly deformed. The elastomer of the compliant layer may stiffen, i.e., its Young's modulus and other moduli may increase significantly as it is deformed. This may cause each compliant layer, and the sandwich structure as a whole, to approximate the behavior of the progressive compound spring system illustrated schematically in FIG. 2A. This compound spring system is composed of two spring elements, one of which does not contribute to the spring constant until the compound spring system has been compressed by an amount 5*. As the stress, i.e., the compression of the compound spring system, exceeds this threshold value, the second spring element begins to provide an additional restoring force and the spring constant increases from $k_1$ to $k_1+k_2$ as illustrated in FIG. 2B. Embodiments of the present invention similarly provide a structure that utilizes the mechanical equivalent of a progressive spring system in order to maintain a compliant-wall response with excellent acoustic performance in the very low strain regime, typical of acoustic disturbances, while also achieving a stiff, structural response for the relatively higher strain regime typical of structural loading. This may be accomplished by ensuring that the architected core possesses geometric features which ensure that the core with coating is both well isolated in the very low strain acoustic disturbance regime from one or both facesheets in a sandwich construction, and firmly affixed to both facesheets for the relatively higher strain structural deflection regime. A sandwich panel, so constructed, may have the advantage of segregating the competing stiffness requirements of the two functions (noise reduction and structural stiffness), and may meet both requirements without significantly sacrificing the performance of either.

The ability of a structure formed according to an embodiment of the present invention to attenuate acoustic waves may be understood as follows. Acoustic disturbances traveling through the air excite vibrations when they interact with a structure. Sandwich panels respond in different modes, either antisymmetric "shear" modes or symmetric "bending" modes, to these acoustic disturbances. Symmetric modes are composed of bending and extensional deformations within the facesheets, and extensional deformations in the core. Antisymmetric modes are composed of bending and extensional deformations within the facesheets and predominantly shearing deformations within the core between the facesheets. The antisymmetric critical frequency occurs when the bending wavespeed matches the speed of sound in air and appears as a pronounced dip in transmission loss referred to as coincidence. The frequency at which this occurs for a sandwich panel with high shear stiffness is:

$$f_c = \frac{c_a^2}{2\pi}\sqrt{\frac{M' + \frac{1}{2}\rho h}{B}}$$

where $c_a$ is the speed of sound in air, M' is the areal density of a facesheet, $\rho$ is the mass density of the core, h is the core thickness, and B is the panel bending stiffness described by:

$$B = \frac{E_f t(h+t)^2}{4(1-v^2)}$$

where $E_f$, t, and v are the facesheet Young's modulus, facesheet thickness, and facesheet Poisson's ratio respectively. At and above the critical frequency, acoustic transmission loss is greatly reduced versus a highly flexible wall of the same mass. A panel with negligible bending stiffness behaves according to the mass-law equation for transmission loss (TL):

$$TL_0 = 10\log_{10}\left(1 + \left(\frac{2\pi fM}{2\rho_{air}c_{air}}\cos\theta\right)^2\right)$$

where $\rho_{air}$ and $c_{air}$ are the density of air and speed of sound in air, M is the areal density of the entire panel, and $\theta$ is the angle of incidence of incoming sound waves (taken as 0° for normal incidence).

Acoustic waves in the middle frequency range can be encouraged to excite transverse shearing waves rather than bending waves if a sandwich core possessing a sufficiently low shear modulus is utilized. This requires a facesheet weighted shear wavespeed somewhat less than the speed of sound in air, i.e., $$c_{shear} = \sqrt{\frac{\mu}{M}} < c_{air}$$

where $\mu$ is the shear modulus of the core. The upper critical frequency limit of this technique, as core shear modulus approaches zero, is the coincidence frequency of an individual facesheet on its own, which is described by:

$$f_{fs} = \frac{c_a^2}{2\pi}\sqrt{\frac{M' + \frac{1}{6}\rho h}{B'}},$$

$$\text{with } B' = \frac{E_f t^3}{12(1-v^2)}.$$

With a sufficiently low shear wavespeed (brought about by a sufficiently low core shear modulus), the critical frequency is shifted upward from the sandwich panel as a whole toward the critical frequency of an individual facesheet. As the shear modulus of the core approaches zero, however, the structural stiffness of the sandwich panel also approaches zero.

Another form of coincidence, symmetric coincidence, occurs at the double wall resonance frequency $f_{dw}$ of a sandwich panel:

$$f_{dw} \cong \frac{1}{2\pi}\sqrt{\frac{\left(\frac{2E_{33}}{h}\right)}{\left(M' + \frac{\rho h}{6}\right)}}$$

where $E_{33}$ is the through-thickness modulus of the core.

To improve (i.e., increase) the transmission loss of a panel, in one embodiment neither of these critical frequencies occurs in the frequency range of interest (e.g., between ~200 and 4000 Hz). This may be accomplished by selecting (i) a very soft core with a very low $\mu$ and $E_{33}$ (to produce high antisymmetric and low symmetric coincidence), or (ii) a very low $\mu$ and a very high $E_{33}$ (high antisymmetric and high symmetric coincidence frequencies), and/or (iii) a very high mass with low bending stiffness (limp mass) and/or (iv) very high damping.

Conversely, structurally strong (e.g., efficient) structural sandwich panels require a high bending stiffness, high strength in transverse compression and shear loading, and a low mass. As a result, the requirements of a structural sandwich panel may be in tension with requirements of a panel with high acoustic TL.

The displacements induced in a sandwich panel by acoustic waves may be significantly lower than acceptable displacements in structural panels. While a structural panel is designed to be very light and stiff, depending on the application, that stiffness is not always necessary in the first 10 to 1000 micrometers ($\mu$m) of panel transverse deflection. Embodiments of the present invention utilize a compliant coating layer with good damping characteristics to accommodate the initial, low stiffness regime in order to achieve high transmission loss, and a relatively rigid, architected structural core to achieve good mechanical performance.

Figure 3:
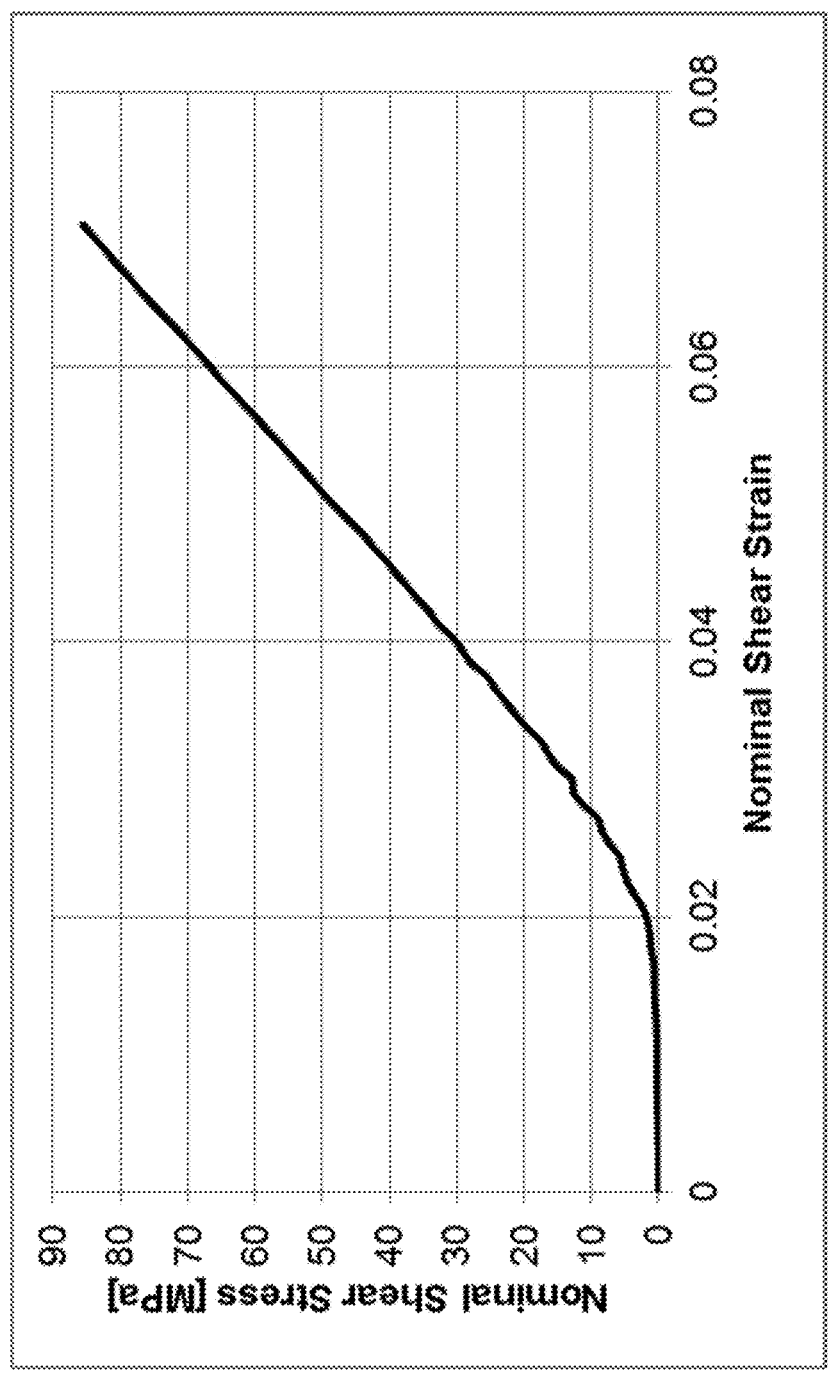
FIG. 3 is a graph of stress as a function of strain for a composite structural panel according to an embodiment of the present invention.
Figure 4:
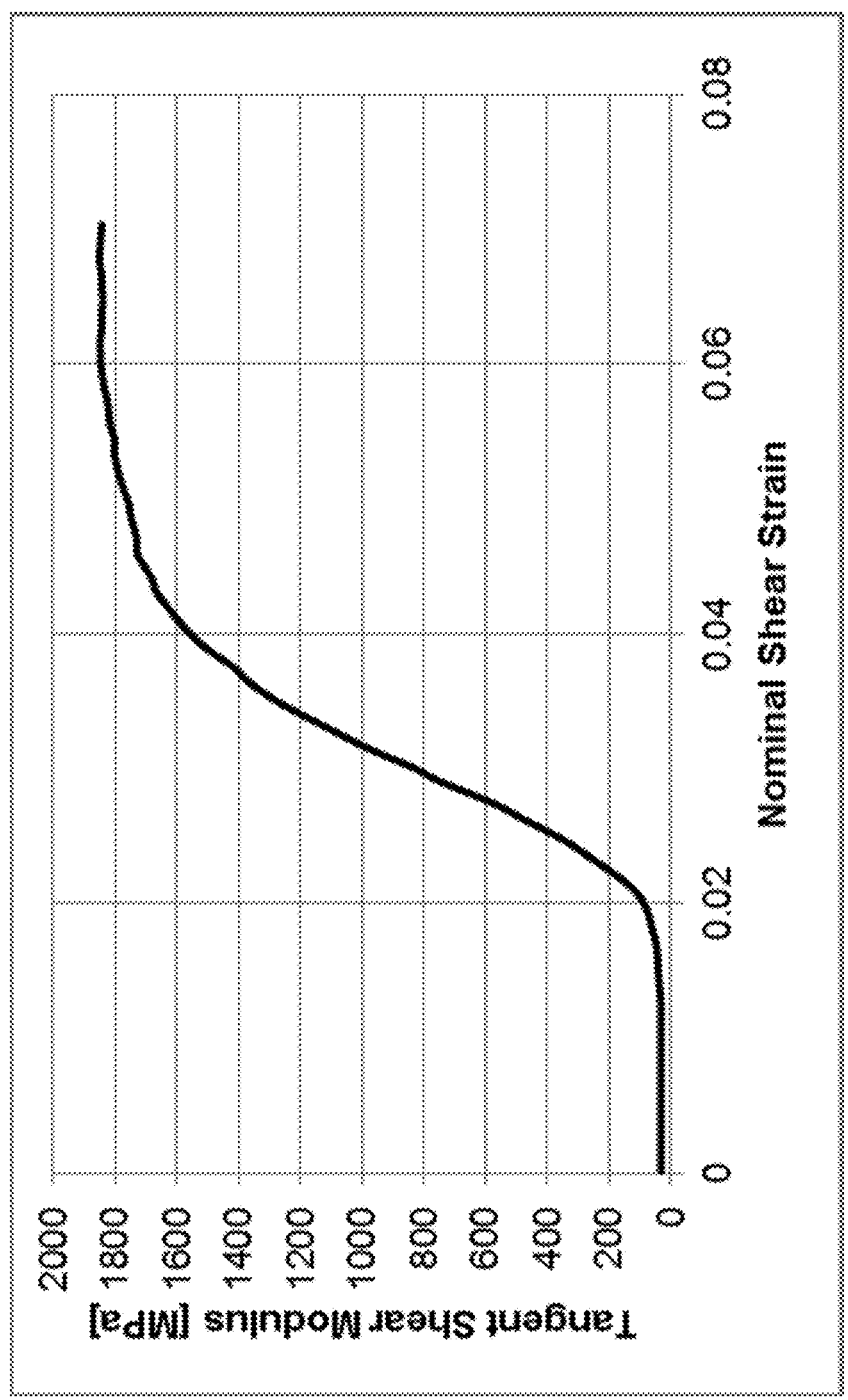
FIG. 4 is a graph of the tangent shear modulus of a composite structural panel as a function of strain according to an embodiment of the present invention.
Figure 5:
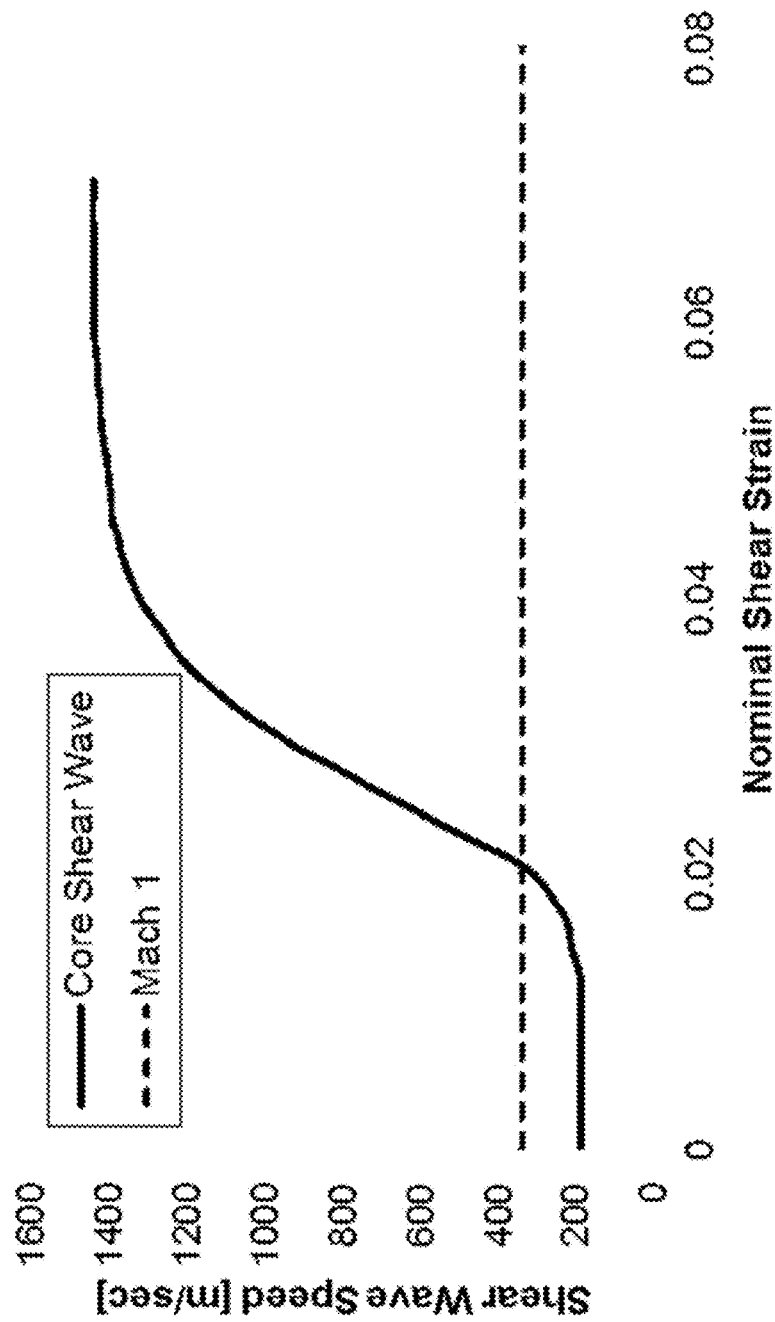
FIG. 5 is a graph of the shear wave speed as a function of nominal shear strain for a composite structural panel according to an embodiment of the present invention.

Two-dimensional finite element simulations were conducted for an embodiment of this invention to determine the core shear stiffness variation with increasing shear strain. An architected core composed of aluminum with an elastomer coating was utilized in this study, where the core was securely interlocked with both the top and bottom facesheet to form a sandwich structure. The results of the simulation are shown in FIGS. 3-5. FIG. 3 shows the stress in the progressive stiffness sandwich as a function of strain. FIG. 4 shows the tangent shear modulus versus shear strain (multi-point averaged) for the progressive stiffness sandwich, which is less, by a factor of at least 30, in a first (low shear strain) state than in a second (high shear strain) state, the first state corresponding to a static shear strain of less than 0.015, and the second state corresponding to a static shear strain of more than 0.05. FIG. 5 shows the shear wave speed versus shear strain for the progressive stiffness sandwich, with the speed of sound in air (Mach 1) shown for reference. The simulations show that with an elastomer layer and appropriate foot design, a core shear wave speed $$c_s = \sqrt{\frac{\mu}{\rho}}$$

of less than Mach 1 (the speed of sound in air) is achievable, even with a relatively high modulus parent material (aluminum) for the architected core. At higher shear strains, the elastomer layer is sufficiently compressed and the shear modulus of the core material increases to that of the architected aluminum core without a soft interlayer.

The following table shows the material properties used in the finite-element simulations:

TABLE 1

| Material Name | Material Model | Young's Modulus [MPa] | Poisson's Ratio | C10 [MPa] | D1 [MPa] |
|---|---|---|---|---|---|
| Silicone Elastomer | Neo Hookean | — | — | 0.18 | 0.02 |
| Aluminum | Isotropic linear elastic | 70000 | 0.33 | — | — |

Figure 11:
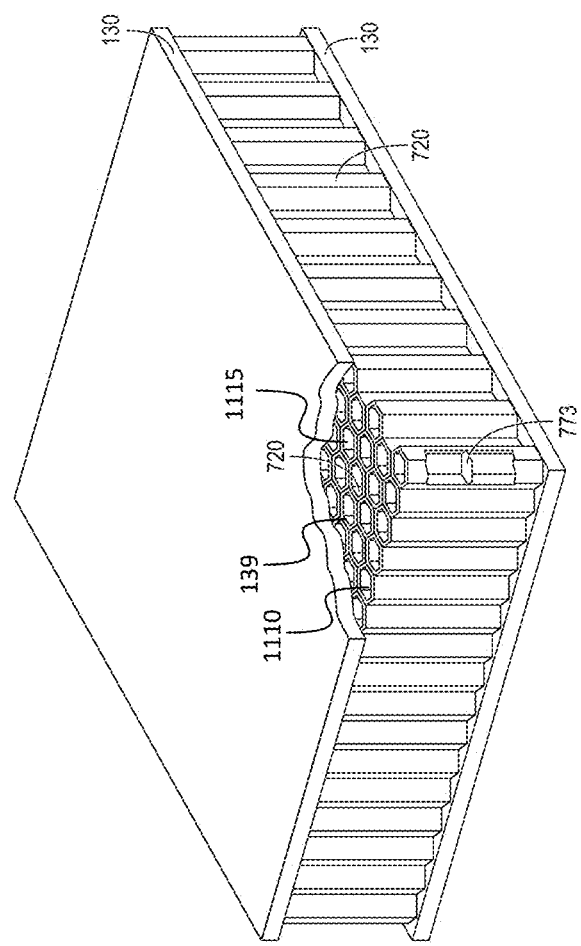
FIG. 11 is a perspective drawing of a sandwich structure with a honeycomb core according to an embodiment of the present invention.
Figure 12:
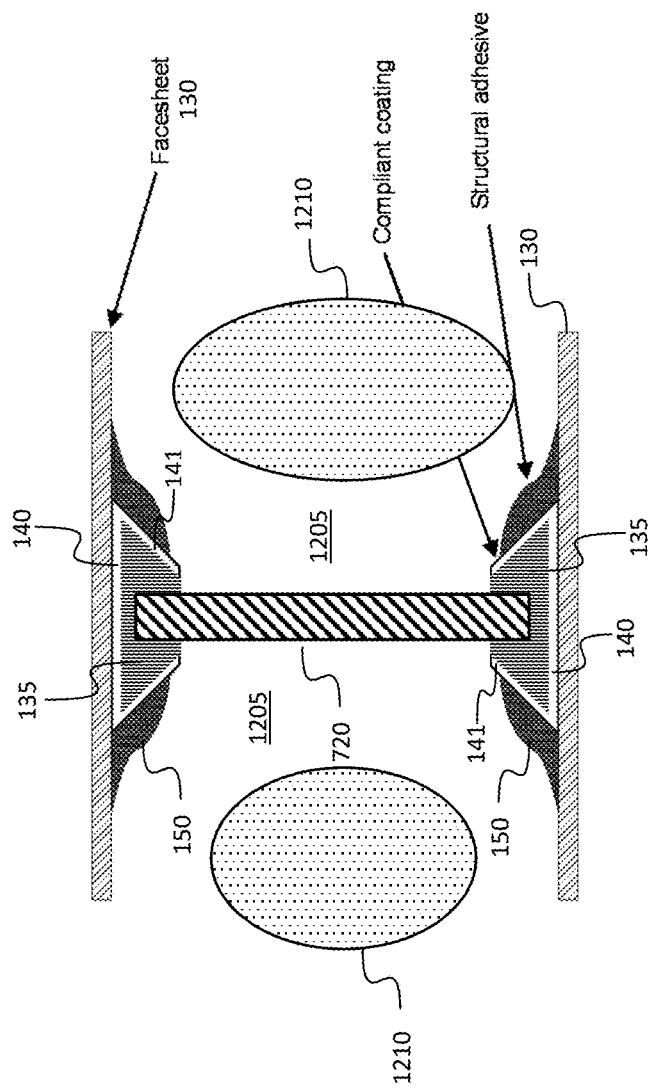
FIG. 12 is a cross-sectional view of a sandwich structure with a honeycomb core according to an embodiment of the present invention.

In some embodiments, the set of casings may form a continuous sheet with a cavity for each pedestal, or the pedestals 135, 136 on one side of the sandwich (i.e., on one of the major surfaces of the core) may be secured to the corresponding facesheet without a compliant layer. In one embodiment, the core is not a micro-truss structure but a different architected material such as honeycomb, as illustrated in FIG. 11. A honeycomb core, for example, may be oriented so that the axis of each cell 1110 of the honeycomb is substantially perpendicular to the honeycomb sandwich facesheets 130. An elongated pedestal may be formed on each edge of the end of each cell, for example by dipping a major surface of a honeycomb sheet into epoxy and setting the sheet onto a non-adhesive flat surface so that, before curing, the epoxy may sag onto the flat surface, forming the flat bottom of a pedestal, and a fillet against each side of the cell wall 720 of the honeycomb cell. Each end of each elongated pedestal may, in this embodiment, be joined to the pedestals of adjacent honeycomb cell walls. FIG. 12 shows a cross section through the facesheets 130, honeycomb core wall 720, pedestals 135, compliant layers 141, and casings 150, for an embodiment with a honeycomb core. Each cell 1110 may have a secluded volume 1115 subdivided by a membrane layer 773.

Because bending modes and shear modes deform the compliant layer at the base of each pedestal, and around the sides of each pedestal, differently (i.e., to different extents, in compression and in shear), it may be possible to adjust the bending wave speed and the shear wave speed independently, by adjusting the thicknesses of these layers independently.

Other embodiments may include other features to improve the performance of the structure. For example, the open volume 1205 of the core may be filled with a porous material 1210 (FIG. 12) in order to increase acoustic transmission loss via reducing the speed of sound within the open volume of the core, or the open volume of the core may be subdivided by a membrane layer of either continuous or selectively perforated construction in order to improve acoustic transmission loss. In the case of a honeycomb core, the secluded volumes within each honeycomb cell may be subdivided by a membrane layer of either continuous or selectively perforated construction in order to improve acoustic transmission loss.

Figure 6A:
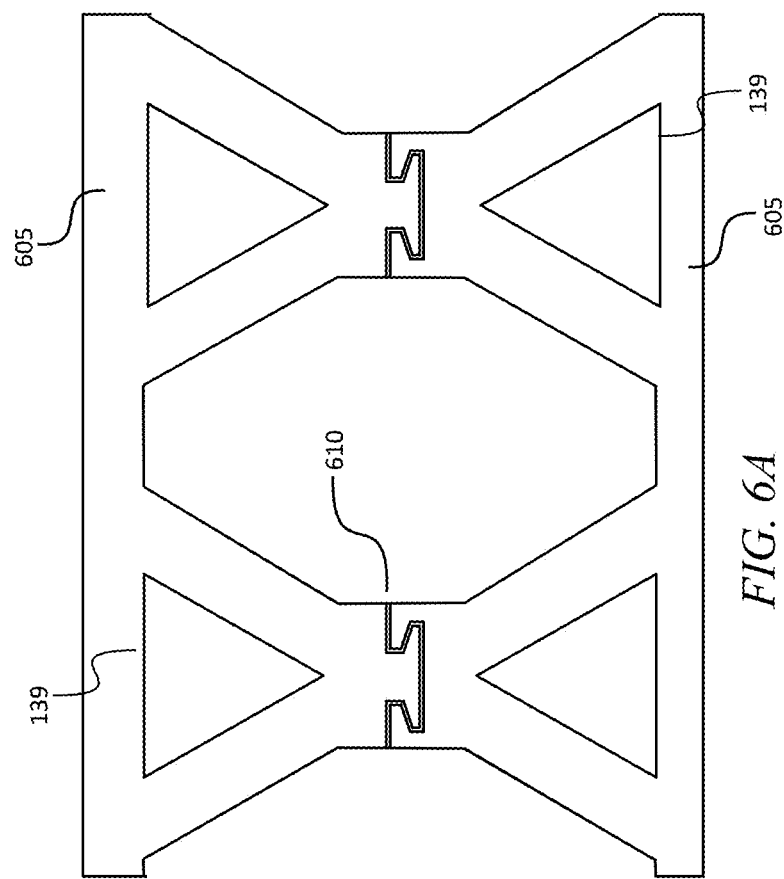
FIG. 6A is a schematic cross-sectional view of a composite structural panel according to another embodiment of the present invention.
Figure 6C:
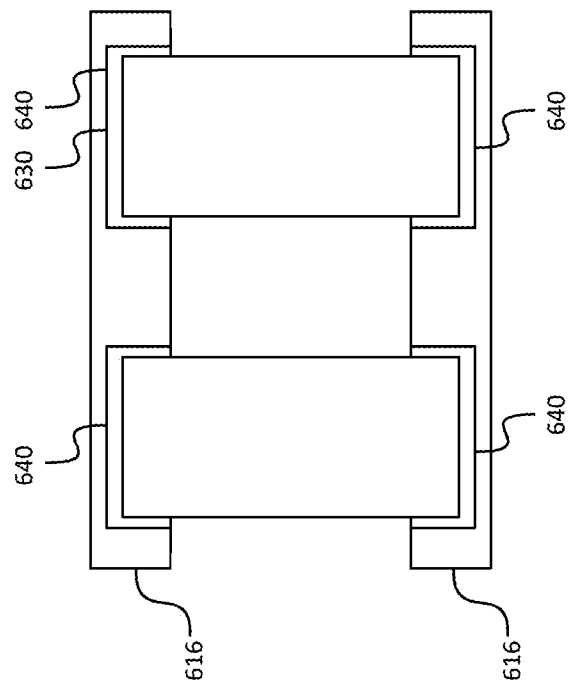
FIG. 6C is a schematic cross-sectional view of a composite structural panel according to another embodiment of the present invention.
Figure 6B:
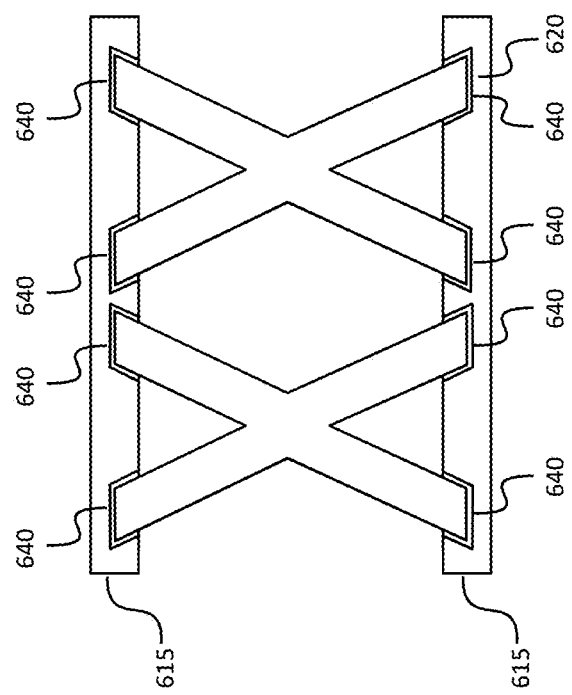
FIG. 6B is a schematic cross-sectional view of a composite structural panel according to another embodiment of the present invention.

FIGS. 6A-6C show three two-dimensional schematics of additional embodiments of the present invention. The embodiment of FIG. 6A has facesheets 605 and a compliant layer 610 near a mid-plane of the core. The core includes prismatic struts connected to the upper face sheet that meet near the mid-plane at a junction that includes a prismatic "T"-shaped protrusion. The core also includes prismatic struts connected to the lower face sheet that meet near the mid-plane at a junction that includes a prismatic channel configured to accommodate the "T"-shaped protrusion. and the embodiments of FIGS. 6B and 6C having facesheets 615, 616, with pockets 620, 630 in the facesheets 615, 616 to accommodate the ends of core members and surrounding compliant layers 640. Any attachment design that serves to isolate the core material from one or both facesheets may provide acceptable characteristics; embodiments, such as those of FIGS. 1A and 1B, that additionally limit the rotational freedom of each unit cell may, however, benefit from improved performance.

Although structural performance and acoustic performance requirements are, in some applications, in tension, embodiments of the present invention significantly improve structural-acoustic sandwich panel performance by separating the response domains of the problem (acoustic disturbances versus structural deflections), and ensuring favorable performance in each domain. Embodiments of the present invention may not require the addition of complex mechanical or active systems (e.g., tuned mass-spring resonators, or electromechanical actuators) or the inclusion of features that would considerably weaken a panel or reduce its structural efficiency (e.g., slotted foam cores, or parasitic masses) in order to achieve the desired goal of a structural panel with high acoustic transmission loss. Structural panels fabricated according to embodiments of the present invention may be used in lightweight structural components that also act as barriers to outside noise, such as vehicle floorboards, or other exterior or interior panels. In the case of a floorboard, for example, when a passenger is entering or exiting the vehicle, the floorboard may be deflected into a high stiffness state, bearing the weight of the passenger, and once the passenger has taken her or his seat, the floorboard may return to a low-stiffness state, exhibiting low shear wave speed and good acoustic attenuation. Additional applications for structural panels or curved sheets fabricated according to embodiments include structural enclosures that house rotating or reciprocating machinery, which may generate airborne or structure-borne vibrations, such as underhood compartments or nacelles, or any suitable component that may carry structure-borne vibration into a passenger compartment.

EXAMPLE

Figure 7A:
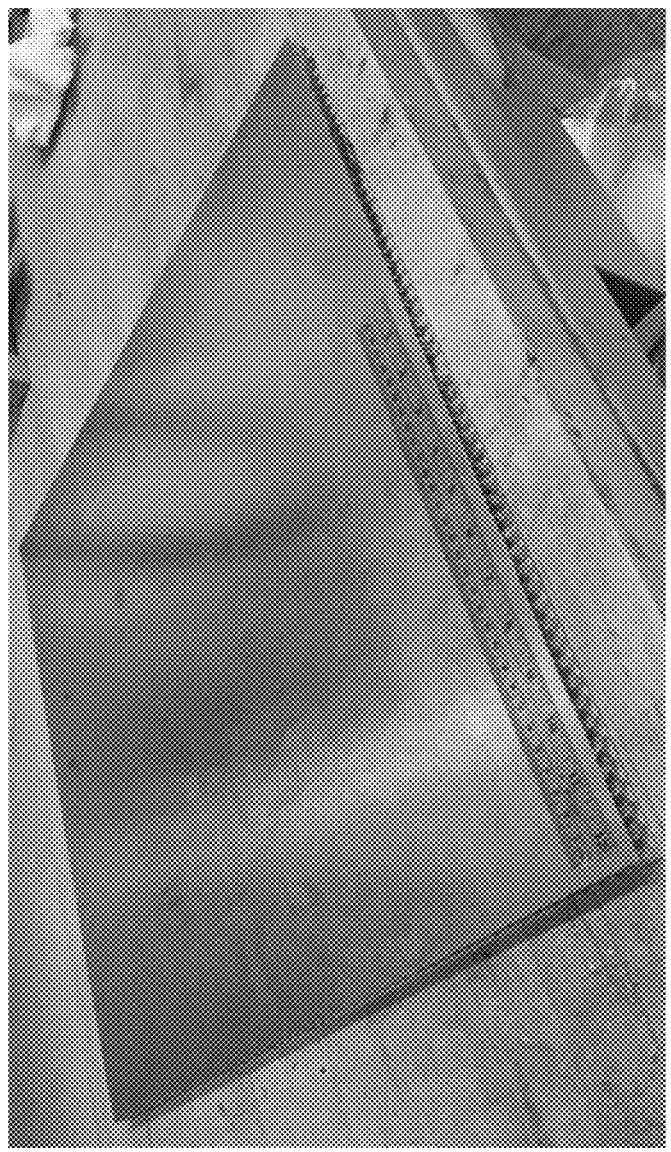
FIG. 7A is a photograph of an example composite structural panel according to an embodiment of the present invention.
Figure 7B:
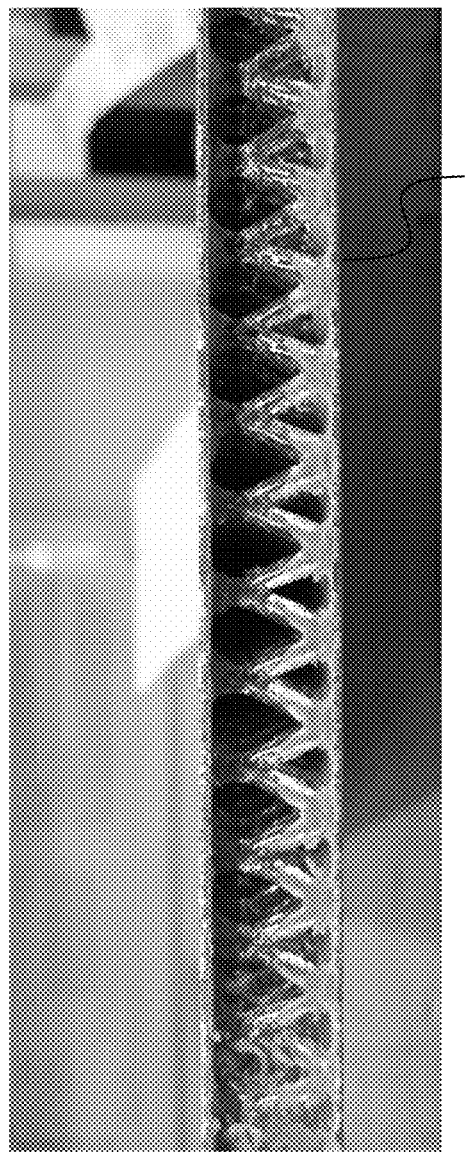
FIG. 7B is a close-in photograph of the composite structural panel of FIG. 7A.

An example of an embodiment of the present invention was fabricated utilizing 1 mm thick 6061-T6 aluminum facesheets, an architected photopolymer micro-truss core, and a 2-part urethane elastomer coating on pedestals at terminating nodes of the core (FIGS. 7A and 7B). The elastomer-coated architected core was joined to the facesheets utilizing an epoxy film adhesive which wicked around the elastomer-coated feet of the architected core during elevated-temperature curing, thus forming a plurality of casements that formed a mechanical interlock between the facesheets and the elastomer-coated core material.

Figure 8:
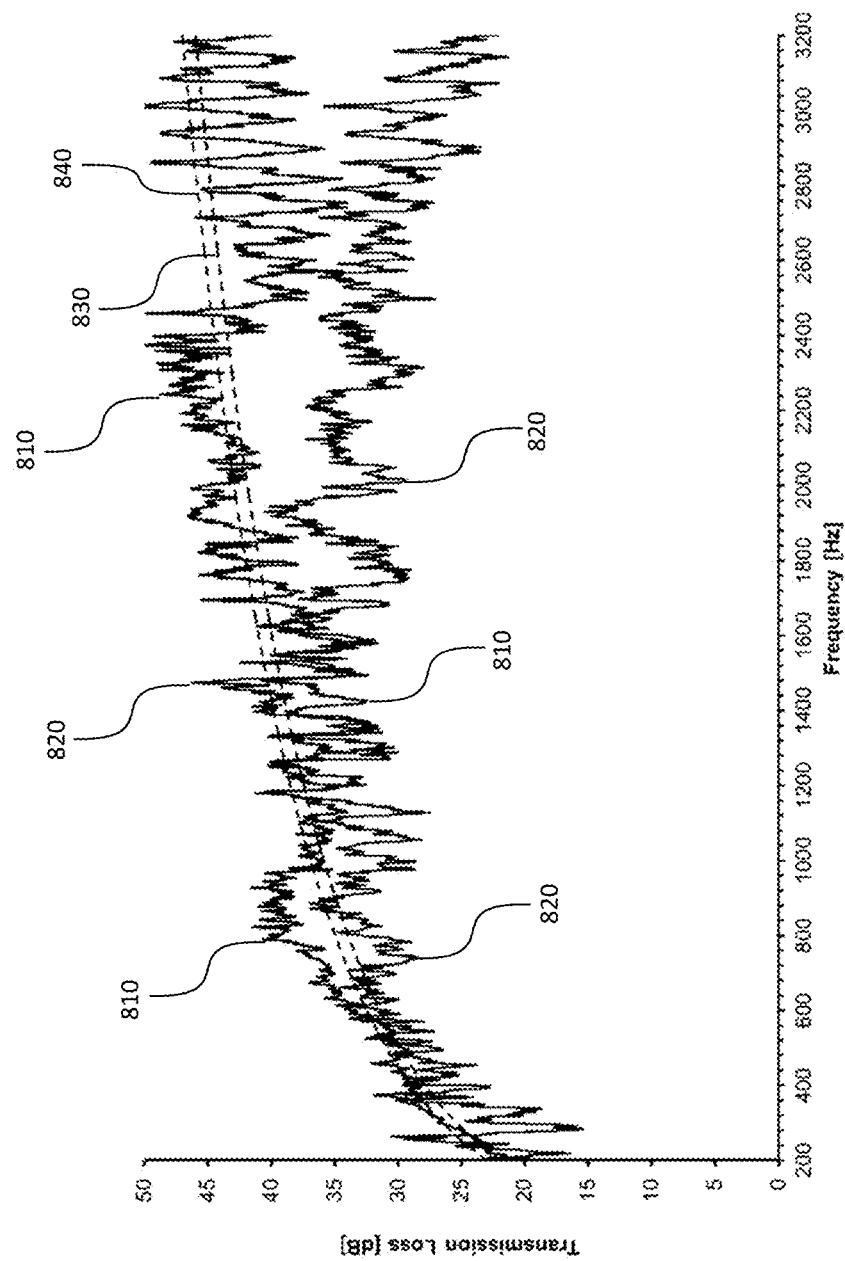
FIG. 8 is a graph of the transmission loss of a composite structural panel according to an embodiment of the present invention along with the transmission loss of another panel used as a control, as a function of frequency.
Figure 9:
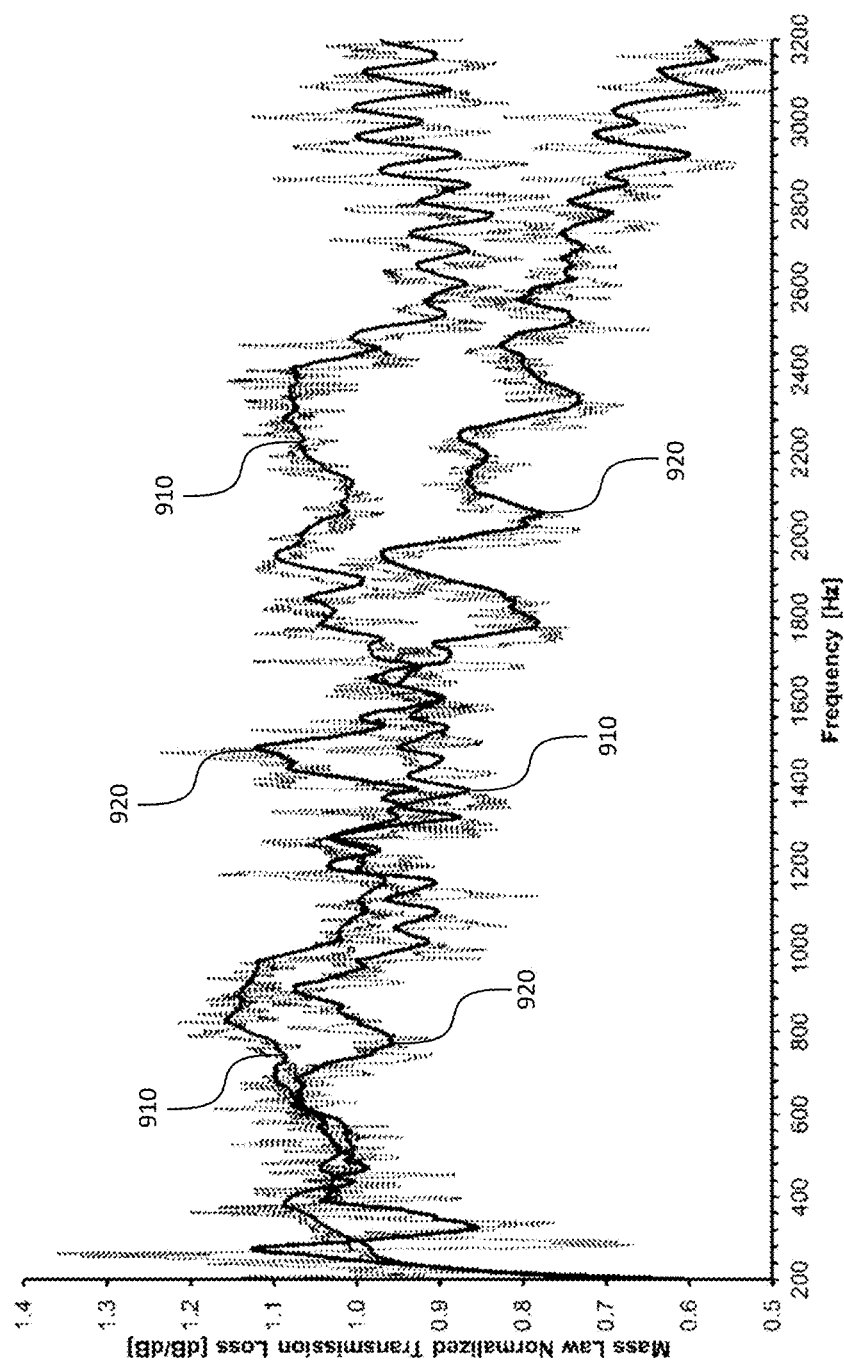
FIG. 9 is a graph of the transmission loss of a composite structural panel according to an embodiment of the present invention along with the transmission loss of another panel used as a control, both normalized to a mass model transmission loss, as a function of frequency.

For comparison, a "control" sandwich structure with an uncoated architected polymer micro-truss core was also constructed. The two sandwich panels were tested for acoustic transmission loss; the results are shown in FIG. 8, with a first curve 810 showing the transmission loss for the example and a second curve 820 showing the transmission loss for the control structure. Also shown are a curve 830 representing the transmission loss expected for a mass-law model with the density of the example, and a curve 840 representing the transmission loss expected for a mass-law model with the density of the control. Mass-law normalized results (calculated as the ratio of the transmission loss in dB (e.g., in FIG. 8) of the example or the control, respectively, to the corresponding mass-law transmission loss, also in dB) are shown in FIG. 9, with a first curve 910 showing a moving average of the mass-law normalized transmission loss for the example and a second curve 920 showing a moving average of the mass-law normalized transmission loss for the control. Each panel tested had dimensions of 0.533 m×0.533 m, with a core thickness of 0.0127 m. The progressive stiffness panel tested had an areal density of 9.1 kg/m$^2$, and the control panel had an areal density of 10.27 kg/m$^2$.

The example structure shows better than mass-law performance between 300 and 1000 Hz and between 1800 and 2400 Hz. The zone in between these regions drops below mass-law performance due to a poorly tuned double wall resonance (symmetric coincidence). In one embodiment, the double wall resonance would be tuned to be outside the frequency range of interest. The example also shows what appears to be antisymmetric coincidence at around 2600 Hz. In one embodiment, the shear stiffness would be reduced to achieve an antisymmetric coincidence above the frequency range of interest. Due to the high damping afforded by the elastomer interlayer, even at coincidence the transmission loss does not drop below approximately (about) 75% of the mass-law transmission loss. The control structure displays small zones of better than mass-law transmission loss, but above about 1400 Hz antisymmetric coincidence effects cause the transmission loss performance of the control structure to dip considerably below the mass-law transmission loss, reaching below 50% of the mass-law transmission loss around 3200 Hz.

The terms "sandwich structure", "sandwich panel" and simply "sandwich" are used interchangeably herein and are synonymous. It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially", "about", and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of present invention". Also, the term "exemplary" is intended to refer to an example or illustration.

As used herein, the terms "use", "using", and "used" may be considered synonymous with the terms "utilize", "utilizing", and "utilized", respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of a progressive stiffness structural-acoustic sandwich panel have been specifically described and illustrated herein, many modifications and variations will be apparent to those skilled in the art. Accordingly, it is to be understood that a progressive stiffness structural-acoustic sandwich panel constructed according to principles of this invention may be embodied other than as specifically described herein. The invention is also defined in the following claims, and equivalents thereof.

What is claimed is:

1. A sandwich structure, comprising:
   an architected core having a first major surface and a second major surface facing away from the first major surface;
   a first facesheet secured to the first major surface; and
   a second facesheet secured to the second major surface,
   the core comprising, at the first major surface, a first plurality of pedestals,
   each of the first plurality of pedestals
      being separated from the first facesheet by a base gap of a first plurality of base gaps, the base gap having a width, and
      being joined to the first facesheet by a compliant base layer of a first plurality of compliant base layers in the first base gap, a thickness of the compliant base layer being equal to the width of the base gap, and a Young's modulus of the compliant base layer being less than a Young's modulus of the first facesheet, wherein the core comprises, as a major component, a micro-truss material comprising: a plurality of first truss members defined by a plurality of first self-propagating polymer waveguides and extending along a first direction.

2. The structure of claim 1, wherein the micro-truss material comprises, as a major component, a material selected from the group consisting of polymers, metals, ceramics, composite materials, and combinations thereof.

3. The structure of claim 1, further comprising:
   a first plurality of pedestal casings, each corresponding to a respective one of the first plurality of pedestals, each pedestal casing secured to the first facesheet and surrounding the corresponding pedestal, an interior side wall of each pedestal casing separated from a side wall of the corresponding pedestal by a side gap, of a plurality of side gaps, having a width; and
   a plurality of compliant side layers, each compliant side layer corresponding to a respective one of the first plurality of pedestals, each compliant side layer having a thickness equal to the width of the side gap and filling the side gap.

4. The structure of claim 3, wherein the widths of each of the plurality of side gaps and of each of the first plurality of base gaps are selected so that over a frequency range of interest a shear wave speed is lower than a speed of sound in air and over the frequency range of interest a bending wave speed is different from the speed of sound in air, the frequency range of interest being the range from 200 Hz to 4000 Hz.

5. The structure of claim 3, further comprising:
   a compliant core-covering layer coating the plurality of first truss members,
   wherein the first plurality of compliant base layers, the plurality of compliant side layers, and the compliant core-covering layer form one continuous body of one material.

6. The structure of claim 5, wherein the material comprises, as a major component, an elastomer with a loss tangent greater than 0.05.

7. The structure of claim 3, wherein each of the first plurality of pedestals comprises a top surface, and wherein each corresponding pedestal casing comprises a top portion covering a portion of the top surface of the corresponding pedestal, an interior top surface of each pedestal casing being separated from a top surface of the corresponding pedestal by a top gap having a width, and
   the structure further comprises a plurality of compliant top layers, each corresponding to a respective one of the first plurality of pedestals, each compliant top layer having a thickness equal to the width of the top gap and filling the top gap.

8. The structure of claim 3, wherein each of the pedestal casings comprises, as a major component, a material selected from the group consisting of epoxy adhesives, acrylic adhesives, photopolymers, and combinations thereof.

9. The structure of claim 3, wherein the pedestal casings of the first plurality of pedestal casings form one continuous body.

10. The structure of claim 1, wherein the micro-truss material further comprises:
   a plurality of second truss members defined by a plurality of second self-propagating polymer waveguides and extending along a second direction; and
   a plurality of third truss members defined by a plurality of third self-propagating polymer waveguides and extending along a third direction,
   wherein the first, second, and third truss members interpenetrate each other at a plurality of nodes to form a continuous material.

11. The structure of claim 1, wherein the core is in the shape of a sheet.

12. The structure of claim 1 wherein each of the first plurality of pedestals has a substantially flat base surface substantially parallel to the first facesheet.

13. The structure of claim 1, wherein a tangent shear modulus of the structure, corresponding to shear of the first facesheet relative to the second facesheet, is less, by a factor of at least 30, in a first state than in a second state, the first state corresponding to a static shear strain of less than 0.015, and the second state corresponding to a static shear strain of more than 0.05.

14. The structure of claim 1, wherein the compliant base layer comprises, as a major component, a material selected from the group consisting of urethane elastomers, thermoplastic elastomers, and combinations thereof.

15. The structure of claim 1, wherein the compliant base layer comprises, as a major component, a filled elastomer.

16. The structure of claim 1, wherein the core comprises, at the second major surface, a plurality of second pedestals,
   each of the second pedestals having a substantially flat base surface
      substantially parallel to the second facesheet,
      separated from the second facesheet by a base gap of a second plurality of base gaps, the base gap of the second plurality of base gaps having a width, and
      being joined to the second facesheet by a compliant base layer, of a second plurality of compliant base layers, in the second base gap, the thickness of the compliant base layer of the second plurality of compliant base layers being equal to the width of the base gap of the second plurality of base gaps, and a Young's modulus of the compliant base layer of the second plurality of compliant base layers being less than 100 megapascals (MPa).

17. The structure of claim 1, wherein the core comprises an open volume, the open volume being filled with a porous material selected to reduce a speed of sound within the open volume of the core and to increase acoustic transmission loss in the structure.

18. The structure of claim 1, wherein the core comprises an open volume, the open volume of the core being subdivided by a membrane layer of continuous or selectively perforated construction.

* * * * *